(12) United States Patent
Azadi Yazdi et al.

(10) Patent No.: US 10,982,648 B2
(45) Date of Patent: Apr. 20, 2021

(54) BLADELESS WIND TURBINE WITH A TELESCOPING NATURAL FREQUENCY TUNING MECHANISM

(71) Applicants: Ehsan Azadi Yazdi, Shiraz (IR); Seyed Alireza Razavi, Shiraz (IR)

(72) Inventors: Ehsan Azadi Yazdi, Shiraz (IR); Seyed Alireza Razavi, Shiraz (IR)

( * ) Notice: Subject to any disclaimer, the term of this patent is extended or adjusted under 35 U.S.C. 154(b) by 0 days.

(21) Appl. No.: 16/833,521

(22) Filed: Mar. 28, 2020

(65) Prior Publication Data

US 2020/0224637 A1 Jul. 16, 2020

Related U.S. Application Data

(60) Provisional application No. 62/826,989, filed on Mar. 30, 2019.

(51) Int. Cl.
| | |
|---|---|
| *F03D 5/00* | (2006.01) |
| *F03D 7/00* | (2006.01) |
| *H02N 2/18* | (2006.01) |
| *H02K 7/18* | (2006.01) |
| *F03D 9/25* | (2016.01) |

(52) U.S. Cl.
CPC ............... *F03D 5/005* (2013.01); *F03D 7/00* (2013.01); *F03D 9/25* (2016.05); *H02K 7/1892* (2013.01); *H02N 2/186* (2013.01)

(58) Field of Classification Search
CPC ......... F03D 5/005; F03D 5/06; H02K 7/1892; H02N 2/186; Y02E 10/70
See application file for complete search history.

(56) References Cited

U.S. PATENT DOCUMENTS

| | | | | |
|---|---|---|---|---|
| 4,342,539 A | * | 8/1982 | Potter ..................... | F03D 13/20 |
| | | | | 416/9 |
| 6,876,094 B2 | * | 4/2005 | Jacobsen ................. | F02B 63/04 |
| | | | | 290/1 R |
| 9,444,372 B2 | * | 9/2016 | Yanez Villarreal .... | H02N 2/188 |
| 9,856,854 B2 | * | 1/2018 | Yanez Villarreal ....... | F03G 7/08 |
| 10,641,243 B2 | * | 5/2020 | Yanez Villarreal .... | H02K 35/02 |
| 2019/0101100 A1 | * | 4/2019 | Y Nez Villareal ....... | F03D 5/06 |
| 2020/0049130 A1 | * | 2/2020 | Yanez Villarreal ....... | F03D 9/25 |
| 2020/0224637 A1 | * | 7/2020 | Azadi Yazdi ............ | F03D 5/06 |

* cited by examiner

*Primary Examiner* — Tulsidas C Patel
*Assistant Examiner* — S. Mikailoff
(74) *Attorney, Agent, or Firm* — Bajwa IP Law Firm; Haris Zaheer Bajwa

(57) ABSTRACT

A bladeless wind turbine may include a flexible support rod mounted on a support surface, an elongated rigid mast mounted on the flexible support rod, and a natural tuning mechanism coaxially mounted around a first portion of the flexible support rod. A natural tuning mechanism may include a housing coaxially attached to the flexible support rod, at least one extendable tube slidably housed within the housing and coaxially mounted and fitted around the flexible support rod. At least one extendable tube may be slidably moveable along the main axis of the flexible support rod and may be extendable beyond the top end of the housing by a predetermined height. A bladeless wind turbine may further include a control unit that may be coupled to the natural tuning mechanism and may be configured to urge the at least one extendable tube to extend beyond the top end of the housing by a predetermined height, where the predetermined height may be calculated by the control unit based on the wind and the elongated rigid mast.

14 Claims, 12 Drawing Sheets

BLADELESS WIND TURBINE WITH A TELESCOPING NATURAL FREQUENCY TUNING MECHANISM

CROSS-REFERENCE TO RELATED APPLICATION

This application claims the benefit of priority from U.S. Provisional Patent Application Ser. No. 62/826,989, filed on Mar. 30, 2019, and entitled "STRUCTURAL NATURAL FREQUENCY TUNING SYSTEM IN BLADELESS WIND TURBINE," which is incorporated herein by reference in its entirety.

TECHNICAL FIELD

The present disclosure relates to bladeless wind turbines, particularly bladeless wind turbines with natural frequency tuning mechanisms. More particularly, the present disclosure relates to systems and methods for tuning the natural frequency of bladeless wind turbines.

BACKGROUND

Multi-blade wind turbines that utilize the wind to rotate the shafts of electric generators have been developed thanks to the shortcomings of conventional fossil fuel-based non-renewable energies. Although these multi-blade wind turbines produce a major share of the electrical energy in many countries, they may have drawbacks such as having complex mechanisms that include rigidly moving blades and their corresponding rotary bearings along with corresponding transmission gearboxes. The complex mechanisms of such multi-blade wind turbines with their large number of moving parts may considerably increase their manufacturing and maintenance fees.

Several different approaches have been taken as alternatives to the multi-blade wind turbines, such as electrical generators based on vortex-induced vibrations (VIV). VIV in a flexible structure may be created by placing the flexible structure in a path of a wind stream. Placing a flexible structure in a path of the wind stream may generate periodic shedding vortices near a surface of the flexible structure, which in turn may result in fluctuations in pressure around the flexible structure yielding to VIV in the flexible structure. The VIV concept may be utilized for developing VIV bladeless wind turbines. A VIV bladeless wind turbine may include a relatively long cylinder mounted on a flexible structure in an airflow field. The airflow around the cylinder introduces a fluctuating crosswise lift force due to the shedding vortices that induces a crosswise vibration in the cylinder. The vibration is converted into electrical energy utilizing a power take-off (PTO) unit, which may be a permanent magnet generator or a piezoelectric generator.

Various technical challenges need to be addressed to achieve a high-power VIV bladeless wind turbine. The power generation in a VIV bladeless wind turbine is considerable when the vortex shedding frequency is close to the structural natural frequency of the wind turbine, which is known as the lock-in phenomenon. The vortex shedding frequency for a body depends on wind speed. As wind speed deviates from the wind speed that corresponds to the lock-in phenomenon, the power generation of the harvester drops rapidly. There is, therefore, a need for a VIV bladeless wind turbine that may include a mechanism for overcoming the possible mismatch between the vortex shedding frequency, and the natural frequency of the wind turbine. In other words, there is a need for a bladeless wind turbine with a natural frequency tuning mechanism that may adjust the natural frequency of the wind turbine structure to keep the natural frequency close to the vortex shedding frequency.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to an exemplary bladeless wind turbine. An exemplary bladeless wind turbine may include an exemplary flexible support rod that may be mounted on a support surface, an exemplary elongated rigid mast that may be mounted on an exemplary flexible support rod, and an exemplary natural tuning mechanism that may be coaxially mounted around a first portion of an exemplary flexible support rod.

An exemplary natural tuning mechanism may include an exemplary housing that may be coaxially attached to an exemplary flexible support rod. An exemplary housing may include a bottom end that may be fixedly attached to an exemplary support surface. An exemplary natural tuning mechanism may further include at least one extendable tube that may be slidably housed within the exemplary housing. At least one exemplary extendable tube may be coaxially mounted and fitted around an exemplary flexible support rod and may be slidably moveable along a main axis of an exemplary flexible support rod beyond a top end of an exemplary housing by a predetermined height.

An exemplary bladeless wind turbine may further include an exemplary power take-off unit that may be coupled to an exemplary flexible support rod. An exemplary power take-off unit may be configured to convert oscillatory movements of an exemplary flexible support rod into electrical energy.

An exemplary bladeless wind turbine may further include an exemplary control unit that may be coupled to an exemplary natural tuning mechanism. An exemplary control unit may include a wind speed sensor that may be configured to measure and transmit a relative velocity between a wind stream and an exemplary elongated rigid mast. An exemplary control unit may further include a controller that may be coupled to an exemplary wind speed sensor and an exemplary natural tuning mechanism. An exemplary controller may be configured to receive, utilizing one or more processors, a relative velocity between a wind stream and an exemplary elongated rigid mast from an exemplary wind speed sensor. An exemplary controller may further be configured to calculate, utilizing the one or more processors, a predetermined height based at least in part on a received relative velocity between a wind stream and an exemplary elongated rigid mast. An exemplary controller may further be configured to urge, utilizing the one or more processors, at least one exemplary extendable tube to extend beyond a top end of an exemplary housing by the calculated predetermined height.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

Figure 1:
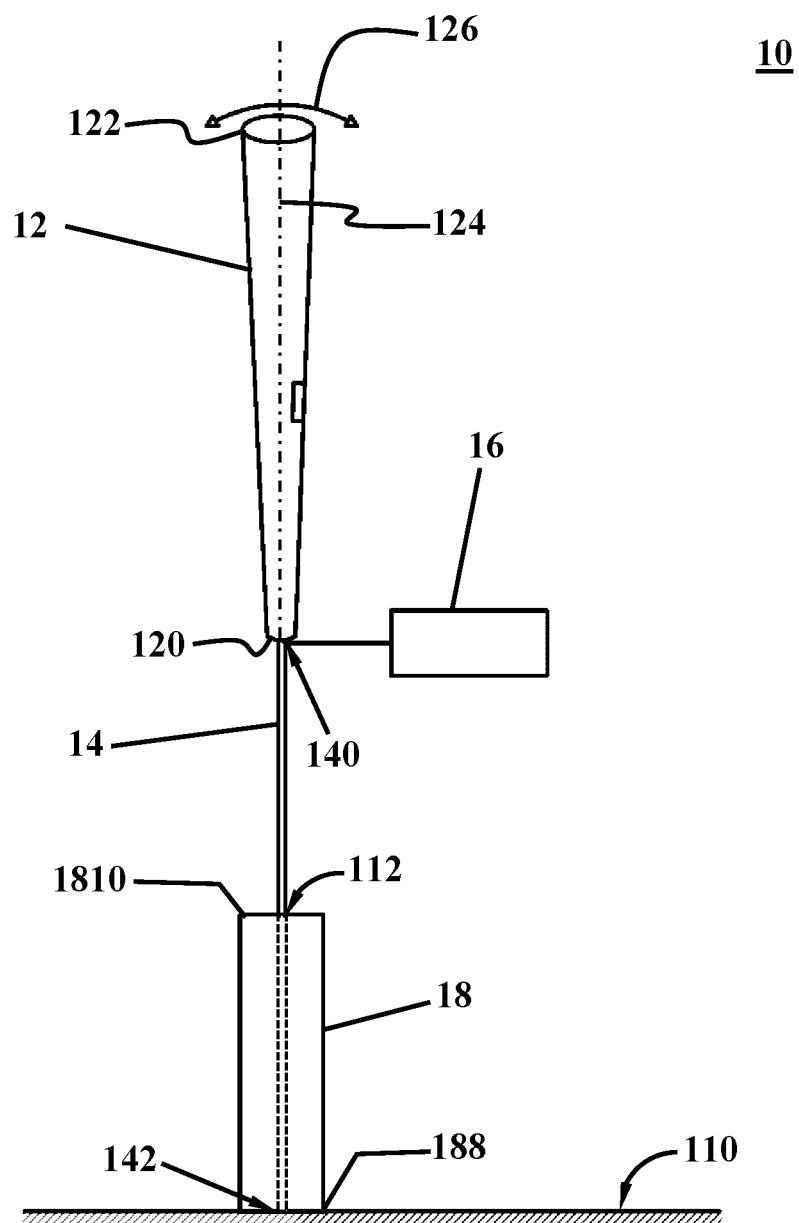
FIG. 1 illustrates a schematic side-view of a bladeless wind turbine, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of an exemplary vortex-induced vibration (VIV)-based bladeless wind turbine that may include an exemplary natural frequency tuning mechanism. The present disclosure is further directed to exemplary embodiments of an exemplary system for structurally tuning the natural frequency of a VIV bladeless wind turbine. An exemplary natural frequency tuning mechanism may allow for tuning the natural frequency of an exemplary VIV bladeless wind turbine such that the natural frequency may be kept close to the vortex shedding frequency around the structure of the exemplary VIV bladeless wind turbine. In other words, an exemplary natural frequency tuning mechanism may allow for keeping an exemplary VIV bladeless wind turbine within a lock-in range to increase energy output of the exemplary VIV bladeless wind turbine. As used herein, the lock-in range may refer to a range of wind speed between which an exemplary VIV bladeless turbine assumes an oscillatory movement, which is a side to side movement perpendicular to a direction of the wind stream. Since the vortex shedding frequency around the structure of an exemplary VIV bladeless wind turbine may change due to changes in wind speeds, the mismatch between the vortex shedding frequency and the natural frequency of an exemplary VIV bladeless wind turbine may frequently occur, which may significantly decrease the amount of energy output of the exemplary VIV bladeless wind turbine.

An exemplary natural frequency tuning mechanism may allow for changing the natural frequency of an exemplary VIV bladeless wind turbine based on changes of the wind speed and therefore allows for avoiding mismatch between the vortex shedding frequency and the natural frequency of an exemplary VIV bladeless wind turbine. An exemplary natural frequency tuning mechanism and method may be based on changing the natural frequency of an exemplary VIV bladeless wind turbine by changing the effective stiffness of the structure of the exemplary VIV bladeless wind turbine.

An exemplary VIV bladeless wind turbine may include an exemplary elongated rigid mast that may be vertically erected in the wind. An exemplary elongated rigid mast may assume an oscillating movement due to vortices induced in the wind by the exemplary elongated rigid mast in a synchronized manner along the exemplary elongated rigid mast. An exemplary elongated rigid mast may be mounted on a flexible support rod that may vertically connect the exemplary elongated rigid mast to a foundation and may facilitate the oscillatory movement of the exemplary elongated rigid mast with respect to the foundation. As used herein, a flexible support rod may refer to a support rod capable of bending sideways to allow for oscillating movement of an exemplary elongated rigid mast mounted on the flexible support rod with respect to the exemplary foundation. As used herein, "flexible" does not necessarily exclude relatively rigid rods that are capable of being bent sideways with respect to the exemplary foundation.

An exemplary natural frequency tuning mechanism may tune or adjust the natural frequency of an exemplary VIV bladeless wind turbine by changing the effective stiffness of an exemplary flexible support rod of the exemplary VIV bladeless wind turbine. The stiffness of an exemplary flexible support rod may be a function of elasticity modulus, cross-sectional area, length, and mass density of an exemplary flexible support rod.

An exemplary natural frequency tuning mechanism may include an exemplary telescopic mechanism, which may be coaxially mounted around an exemplary flexible support rod. An exemplary telescopic mechanism may include exemplary extendable concentric tubes that may be selectively extended around an exemplary flexible support rod. An exemplary telescopic mechanism may be configured to dynamically change the effective flexural stiffness and the effective moment of inertia of an exemplary VIV bladeless wind turbine by selectively extending exemplary concentric tubes around an exemplary flexible support rod of the exemplary VIV bladeless wind turbine. An exemplary telescopic structure may function as a telescopic cover mechanism which may coaxially encompass a portion of an exemplary flexible support rod and thereby may change the effective flexural stiffness and the effective moment of inertia of the VIV bladeless wind turbine. As used herein, the effective flexural stiffness may be the sum of flexural stiffnesses of the exemplary flexible support rod and the extended concentric tubes of the exemplary telescopic structure. Here, the extent to which the effective flexural stiffness and the effective moment of inertia are changed, may be determined, at least partially, based on the amounts that the concentric tubes of the exemplary telescopic structure may be extended around the exemplary flexible structure.

An exemplary telescopic mechanism may include a number of coaxial hollow tubes that may be disposed in one another such that a telescopic structure with different layers may be formed, in which the tube with the smallest diameter may be the innermost tube within the telescopic structure and the tube with the largest diameter may be the outermost tube within the telescopic structure. In an exemplary telescopic mechanism, the innermost tube of the structure with the smallest diameter may have a slightly larger diameter than an exemplary flexible rod such that the innermost tube may tightly surround and may be slidable along the length of the exemplary flexible support rod. In an exemplary embodiment, coaxial hollow tubes may have circular cross-sections and may be arranged as a plurality of coaxially telescoping cylinders. However, an exemplary flexible support rod may not necessarily have a circular cross-section, and it may have a cross-section with a different shape, for example, the shape of a square, rectangle, triangle, polygon, etc. Accordingly, exemplary coaxial hollow tubes of an exemplary telescopic structure may have cross-sections with shapes similar to the exemplary flexible support rod. For example, if an exemplary support rod has a cross-section in the shape of a rectangle, corresponding coaxial hollow tubes of an exemplary telescopic structure may also have rectangular cross-sections.

An exemplary natural frequency tuning mechanism may further include a control unit that may be coupled to a sensor and an exemplary telescopic mechanism of the exemplary natural frequency tuning mechanism. An exemplary control unit may be configured to receive the wind speed data from an exemplary sensor and based at least in part on the changes in the wind speed, urge an exemplary telescopic mechanism to change the effective stiffness of an exemplary flexible support rod of an exemplary VIV bladeless wind turbine.

In exemplary embodiments, such configuration of an exemplary telescopic mechanism, an exemplary sensor, and an exemplary control unit may allow for dynamically changing a natural frequency of an exemplary VIV bladeless wind turbine based at least in part on changes of the wind speed. Dynamically changing the natural frequency of an exemplary VIV bladeless wind turbine may widen the lock-in range of the exemplary VIV bladeless wind turbine, and consequently, may lead to an increase in the energy output of the exemplary VIV bladeless wind turbine.

FIG. 1 illustrates a schematic side-view of a bladeless wind turbine 10, consistent with one or more exemplary embodiments of the present disclosure. In an exemplary embodiment, bladeless wind turbine 10 may include an elongated rigid mast 12 that may be vertically erected in the wind flow field, a flexible support rod 14 on which elongated rigid mast 12 may be mounted, a power take-off unit (PTO) 16 that may be configured to convert the oscillatory movement of elongated rigid mast 12 to electrical energy, and a natural frequency tuning mechanism 18 that may be configured to adjust the natural frequency of bladeless wind turbine 10 by adjusting the effective flexural stiffness of flexible support rod 14.

In an exemplary embodiment, elongated rigid mast 12 may be in the shape of a vertical pole that may extend vertically from a bottom end 120 towards a top end 122 of elongated rigid mast 12. In an exemplary embodiment, as used herein, a vertical pole may refer to a pole with a longitudinal axis 124 arranged perpendicularly with respect to support surface 110. Elongated rigid mast 12 may have a cross-section of various shapes, for example, the shape of a circle, square, rectangle, triangle, polygon, etc. In an exemplary embodiment, elongated rigid mast 12 may have a circular cross-section that may be arranged as a vertical cylindrical or conical pole. In an exemplary embodiment, such circular cross-section may allow for bladeless wind turbine 10 to operate independent of the wind direction, while in case of other cross-sectional shapes, wind direction may become an important factor that may have a negative impact when the wind direction does not allow the wind turbine to property function.

In an exemplary embodiment, when elongated rigid mast 12 is disposed within a wind flow field, a series of vortices may be produced periodically on either side of elongated rigid mast 12 as a result of the wind impacting elongated rigid mast 12. Such periodic shedding vortices near the surface of elongated rigid mast 12 in the wind may result in pressure fluctuations around elongated rigid mast 12 that may yield to vortex-induced vibration (VIV) or vortex-induced crosswise oscillatory movement in elongated rigid mast 12. As used herein, a crosswise oscillatory movement may refer to elongated rigid mast 12 assuming a back and forth oscillatory movement in a direction (such as the one shown by arrow 126 in FIG. 1) substantially perpendicular to the general wind flow direction (for example, the wind flow direction is perpendicular to the view in FIG. 1) under a lift force exerted by the wind. As used herein, the frequency of formation of vortices on either side of elongated rigid mast 12 may be referred to as vortex shedding frequency. As mentioned before in the preceding paragraphs, the maximum energy output of bladeless wind turbine 10 may occur when this vortex shedding frequency is close to a natural frequency of the structure of bladeless wind turbine 10. In an exemplary embodiment, elongated rigid mast 12 may have a conical shape as illustrated in FIG. 1. Since the vortex shedding frequency depends on both the relative velocity between the wind and elongated rigid mast 12 and on the diameter of elongated rigid mast 12, it may be appropriate for the diameter of elongated rigid mast 12 to increase with height from bottom end 120 toward top end 122 as the relative velocity between the wind and elongated rigid mast 12 increases with height. In an exemplary embodiment, elongated rigid mast 12 may be mounted on and attached to flexible support rod 14 from bottom end 120.

In an exemplary embodiment, flexible support rod 14 may be a vertically erected rod with a cross-section of various shapes, for example, the shape of a circle, square, rectangle, triangle, polygon, etc. In an exemplary embodiment, flexible support rod 14 may have a circular cross-section that may be arranged as a vertical cylindrical rod with a top rod end 140 and a bottom rod end 142. In an exemplary embodiment, flexible support rod 14 may join elongated rigid mast 12 to an anchoring point 112, at which the oscillation of flexible support rod 14 may be almost zero. In other words, sideway oscillatory movements of elongated rigid mast 12 and in turn flexible support rod 14 may be around and with respect to anchoring point 112. In an exemplary embodiment, bottom rod end 142 may be attached fixedly to support surface 110. In an exemplary embodiment, flexible support rod 14 may be configured to facilitate oscillatory movements of elongated rigid mast 12 around and with respect to anchoring point 112 despite the stiffness of elongated rigid mast 12. In other words, in an exemplary embodiment, flexible support rod 14 may be elastically deformed sideways, in an oscillatory manner, allowing elongated rigid mast 12 to oscillate as well. As used herein, flexible may refer to the flexible characteristics of flexible support rod 14 in the sense that, after being bent in one direction due to the oscillatory movement of elongated rigid mast 12, flexible support rod 14 may tend to return to its original vertical shape. Accordingly, the adjective "flexible" used for flexible support rod 14 neither means that flexible support rod 14 must be made of elastic materials nor necessarily excludes rods made of relatively rigid materials that allow for bending flexible support rod 14 sideways with respect to anchoring point 112. Simply put, for the purposes of the present disclosure, any rod made of any material that may be capable of being bent sideways may be considered flexible.

In an exemplary embodiment, elongated rigid mast 12 may be in axial alignment with flexible support rod 14. In an exemplary embodiment, top rod end 140 of flexible support rod 14 may be attached to bottom end 120 of elongated rigid mast 12, such that at equilibrium, when flexible support rod 14 and elongated rigid mast 12 are not oscillating, flexible support rod 14 may be vertically extended along longitudinal axis 124 of elongated rigid mast 12. At very low wind speeds, elongated rigid mast 12 may not assume an oscillatory movement. As wind speed increases to a speed at which the vortex shedding frequency coincides with the natural frequency of flexible support rod 14, the amplitude of the oscillatory movement of elongated rigid mast 12 may reach a maximum. However, if the wind speed continues to increase, the amplitude of the oscillatory movement of elongated rigid mast 12 may begin to decrease, since the vortices start to be generated too quickly, while the natural frequency of flexible support rod 14 is constant. Finally, when the wind speed is very high, elongated rigid mast 12 stops oscillating. As explained in the preceding paragraphs, the wind speed range, at which, elongated rigid mast 12 maintains an oscillatory movement is referred to as the lock-in range. Normally this lock-in range is very narrow, however, the lock-in range of bladeless wind turbine 10 may be widened by tuning the natural frequency of bladeless wind turbine 10 utilizing natural frequency tuning mechanism 18.

In an exemplary embodiment, natural tuning mechanism 18 may be mounted on support surface 110 around flexible support rod 14. As used herein, support surface 110 may refer to any rigid foundation that may support bladeless wind turbine 10. In an exemplary embodiment, natural tuning mechanism 18 may include a first end 188 that may be mounted on support surface 110. Natural tuning mechanism 18 may extend upward around a portion of flexible support rod 14 to a second end 1810. In an exemplary embodiment, anchoring point 112 may coincide with second end 1810 of natural frequency tuning mechanism 18. Accordingly, the oscillation of flexible support rod 14 may be almost zero at second end 1810 of natural frequency tuning mechanism 18 and flexible support rod 14 may oscillate with respect and around second end 1810. One important factor affecting the natural frequency of bladeless wind turbine 10 may be the flexural stiffness of flexible support rod 14 or at least a portion of flexible support rod 14 that may assume an oscillatory movement. Accordingly, in exemplary embodiments, changing the effective flexural stiffness of at least a portion of flexible support rod 14 from anchoring point 112 to top rod end 120, which is a portion of flexible support rod 14 that oscillates with respect to anchoring point 112, may lead to changing the natural frequency of bladeless wind turbine 10. In an exemplary embodiment, natural frequency tuning mechanism 18 may be configured to dynamically change the natural frequency of bladeless wind turbine 10 by dynamically changing the effective flexural stiffness of flexible support rod 14. As used herein, stiffness may refer to a flexural stiffness of an exemplary flexible structure. The flexural stiffness may be a function of two physical properties, namely, the elastic modulus of the material that may compose an exemplary flexible structure, and the area moment of inertia of an exemplary flexible structure. The area moment of inertia of an exemplary flexible structure may be a function of the cross-sectional geometry of that exemplary flexible structure. In exemplary embodiments, such dependence of the flexural stiffness on the cross-sectional geometry may be taken advantage of for dynamically tuning the stiffness of flexible support rod 14, as will be described in connection with the structure of natural frequency tuning mechanism 18.

Figure 2A:
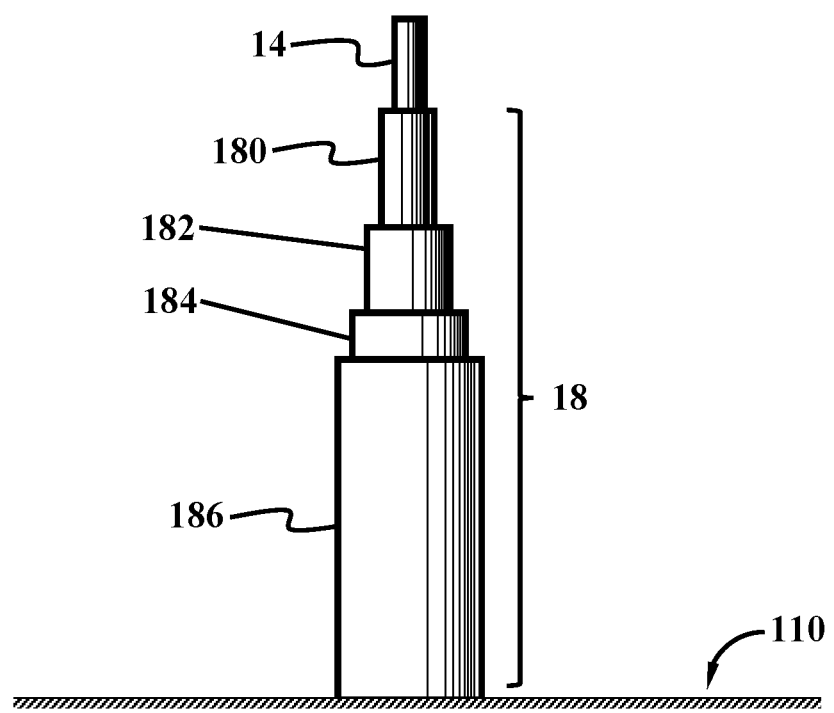
FIG. 2A illustrates a side view of a natural frequency tuning mechanism, consistent with one or more exemplary embodiments of the present disclosure.
Figure 2B:
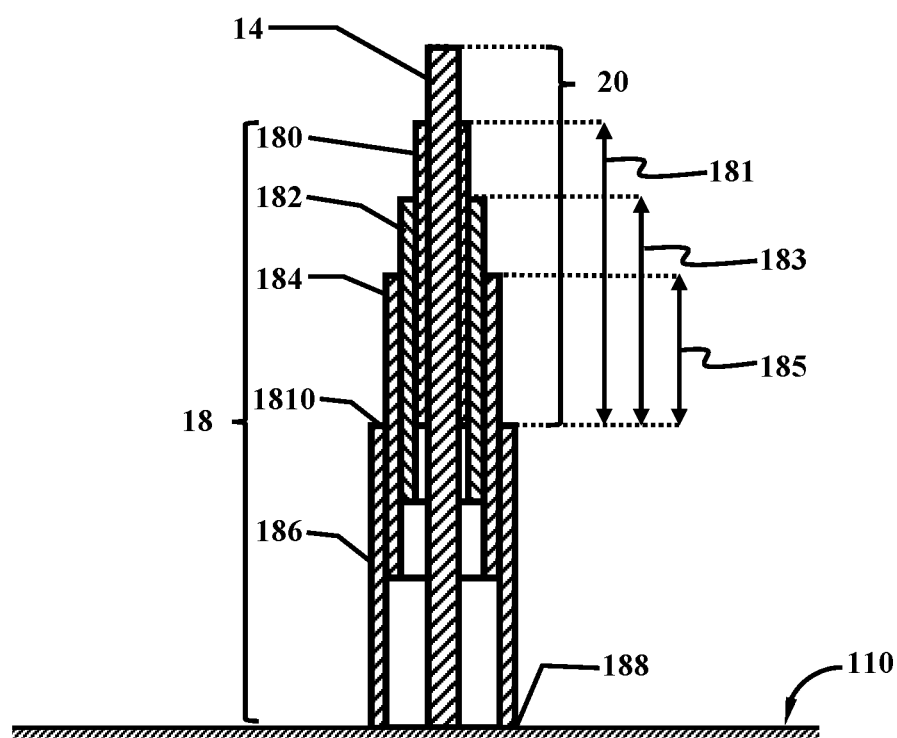
FIG. 2B illustrates a sectional side view of a natural frequency tuning mechanism in an extended position, consistent with one or more exemplary embodiments of the present disclosure.
Figure 2C:
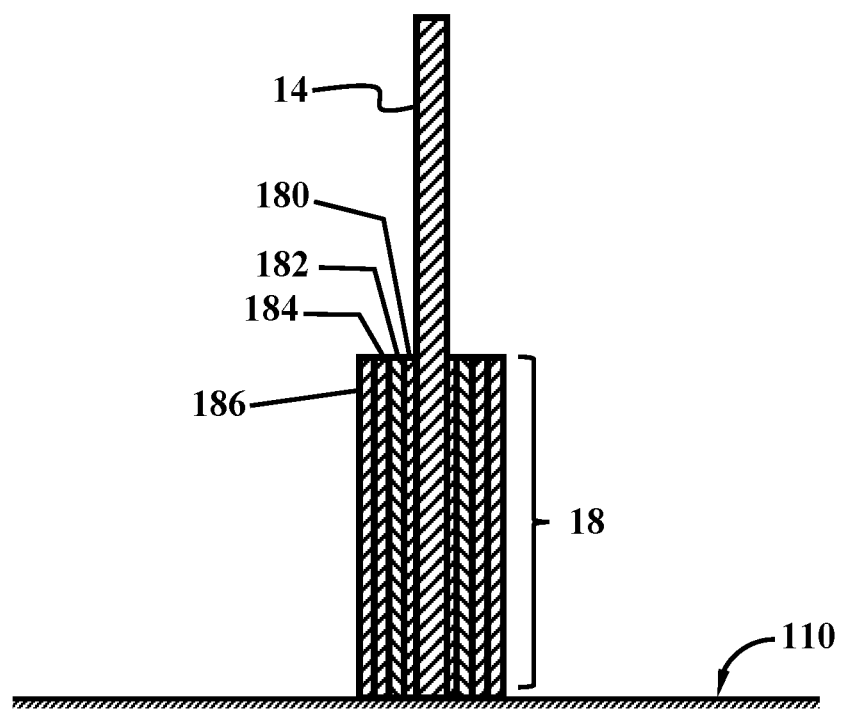
FIG. 2C illustrates a sectional side view of a natural frequency tuning mechanism in a retracted position, consistent with one or more exemplary embodiments of the present disclosure.
Figure 2D:
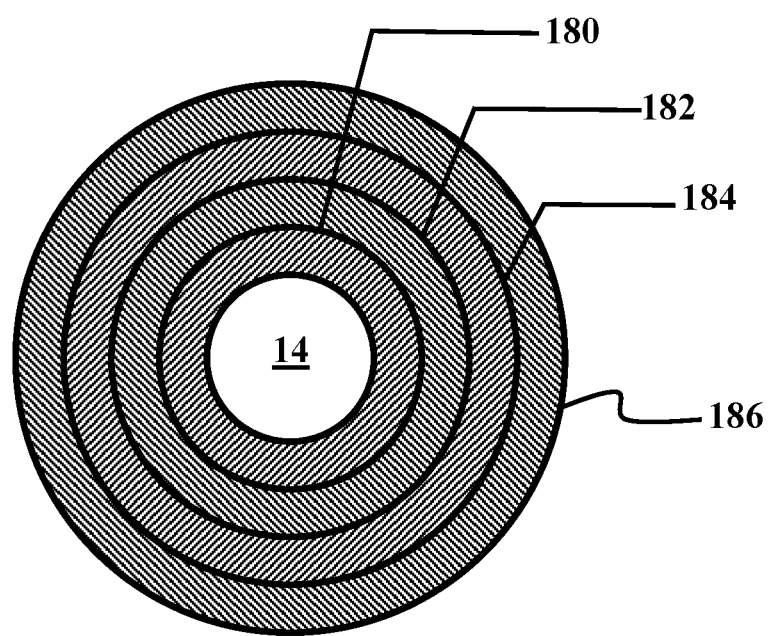
FIG. 2D illustrates a sectional top view of a natural frequency tuning mechanism, consistent with one or more exemplary embodiments of the present disclosure.

FIG. 2A illustrates a side view of a natural frequency tuning mechanism 18, consistent with one or more exemplary embodiments of the present disclosure. FIG. 2B illustrates a sectional side view of natural frequency tuning mechanism 18 in an extended position, consistent with one or more exemplary embodiments of the present disclosure. FIG. 2C illustrates a sectional side view of natural frequency tuning mechanism 18 in a retracted position, consistent with one or more exemplary embodiments of the present disclosure. FIG. 2D illustrates a sectional top view of natural frequency tuning mechanism 18, consistent with one or more exemplary embodiments of the present disclosure.

In an exemplary embodiment, natural frequency tuning mechanism 18 may be a telescopic structure that may include an inner extendable tube 180, at least one intermediate extendible tube 182, and an outer extendable tube 184. In an exemplary embodiment, inner extendable tube 180, intermediate extendible tube 182, and outer extendable tube 184 may have aligned longitudinal axes and successively decreasing transverse dimensions from outer extendable tube 184 toward inner extendable tube 180. In an exemplary embodiment, inner extendable tube 180 may be slidably disposed within intermediate extendible tube 182 and intermediate extendible tube 182 may be slidably disposed within outer extendable tube 184. In an exemplary embodiment, natural frequency tuning mechanism 18 may further include a housing 186 within which, outer extendable tube 184 may be slidably disposed. In an exemplary embodiment, housing 186 may include a hollow tube that may be fixedly attached to support surface 110. In an exemplary embodiment, natural frequency tuning mechanism 18 may coaxially be disposed around flexible support rod 14 such that inner extendable tube 180 may snuggly fit around an outer surface of flexible support rod 14 in a sliding relationship along a main axis of flexible support rod 14. As used herein, in a sliding relationship may refer to a relationship between flexible support rod 14 and inner extendable tube 180, where an inner diameter or an inner characteristic dimension of inner extendable tube 180 may be equal to or slightly larger than an outer diameter or outer characteristic dimension of flexible support rod 14 such that inner extendable tube 180 may fit closely around flexible support rod 14 and yet may be capable of sliding along the main axis of flexible support rod 14.

In an exemplary embodiment, inner extendable tube 180, intermediate extendable tube 182, and outer extendable tube 184 may have circular cross-sections and may be arranged as a plurality of telescoping cylinders within housing 186 which may also have a circular cross-section. In an exemplary embodiment, inner extendable tube 180, intermediate extendible tube 182, and outer extendable tube 184 may have cross-sections with other possible shapes corresponding to each other's respective shapes, such as square, rectangle, triangle, polygon, etc. In this case, a characteristic dimension may be defined for each extendable tube. A characteristic dimension for a given cross-section, as used herein, may refer to a diameter of a circular cross-section with a cross-sectional area equal to that of the given cross-section. In an exemplary embodiment, where inner extendable tube 180, intermediate extendible tube 182, and outer extendable tube 184 may have cross-sections other than circular, inner extendable tube 180, intermediate extendible tube 182, and outer extendable tube 184 may have successively decreasing characteristic dimensions from outer extendable tube 184 toward inner extendable tube 180 to allow for the aforementioned tubes to be telescopically disposed within each other. In an exemplary embodiment, natural frequency tuning mechanism 18 may include more than one intermediate extendable tubes with successively decreasing characteristic dimensions from the outermost intermediate extendable tube toward the innermost intermediate extendable tube. For simplicity, only one intermediate extendable tube is illustrated in FIGS. 2A-2D.

In an exemplary embodiment, housing 186 of natural frequency tuning mechanism 18 may have the largest characteristic dimension and may be rigidly secured to support surface 110. In an exemplary embodiment, a top end of housing 186 may coincide with a second end 1810 of natural frequency tuning mechanism 18 where anchoring point 112 may be defined. A bottom end of housing 186 may coincide with first end 188 of natural frequency tuning mechanism 18 where housing 186 may be fixedly attached to and mounted on support surface 110. In an exemplary embodiment, inner extendable tube 180, intermediate extendible tube 182, outer extendable tube 184, and housing 186 may all have similar heights. In exemplary embodiments, heights of inner extendable tube 180, intermediate extendible tube 182, and outer extendable tube 184 may be such that to allow inner extendable tube 180, intermediate extendible tube 182, and outer extendable tube 184, when extended, to partially surround a portion of flexible support rod 14 which extends beyond second end 1810 of natural frequency tuning mechanism 18, for example, portion 20 as designated in FIG. 2B.

Referring to FIG. 2C, in a fully retracted position, inner extendable tube 180, intermediate extendible tube 182, and outer extendable tube 184 may be housed within housing 186. In this fully retracted position, flexible support rod 14 may have a natural frequency corresponding to the flexural stiffness of flexible support rod 14.

Referring to FIG. 2B, in an exemplary embodiment, inner extendable tube 180, intermediate extendible tube 182, and outer extendable tube 184 may be telescopically extended out of housing 186 and surround the portion of flexible support rod 14 that extends beyond second end 1810 of natural frequency tuning mechanism 18 (referred to hereinafter as portion 20). In an exemplary embodiment, natural frequency of portion 20 may be manipulated by manipulating the effective flexural stiffness and the effective moment of inertia of portion 20 by selectively extending inner extendable tube 180, intermediate extendible tube 182, and outer extendable tube 184 around portion 20 of flexible support rod 14. In an exemplary embodiment, inner extendable tube 180 may be extended beyond second end 1810 by a first height 181, intermediate extendible tube 182 may be extended beyond second end 1810 by a second height 183, and outer extendable tube 184 may be extended beyond second end 1810 by a third height 185. In exemplary embodiments, for given cross-sectional areas, and given mass densities of inner extendable tube 180, intermediate extendible tube 182, and outer extendable tube 184, the amounts for first height 181, second height 183, and third height 185 may be determined such that natural frequency of portion 20 may be equal to the vortex shedding frequency around bladeless wind turbine 10.

Referring to FIG. 2D, in an exemplary embodiment, in order to uniformly tune the effective flexural stiffness of bladeless wind turbine 10, all extendable tubes of the telescopic structure of natural frequency tuning mechanism 18, namely, inner extendable tube 180, at least one intermediate extendable tube 182, and outer extendable tube 184 may have cross-sections with the same value for the moment of inertia as flexible support rod 14. For example, for inner extendable tube 180, intermediate extendable tube 182, and outer extendable tube 184 with circular cross-sections, if inner extendable tube 180 has an inner radius of $R_0$, outer radius of inner extendable tube 180 may be $2^{0.25} \times R_0$, such that inner extendable tube 180 may have the same value of the area moment of inertia as flexible support rod 14. Similarly, intermediate extendible tube 182 adjacent to inner extendable tube 180 may have an inner radius of $2^{0.25} \times R_0$ and an outer radius of $3^{0.25} \times R_0$. As used herein, $R_0$ refers to a radius of flexible support rod 14. If the above-described radiuses are chosen, by extending, for example, N extendable tubes (inner extendable tube 180, outer extendable tube 184 and (N−2) intermediate extendable tubes) to an extended position (FIG. 2B), the flexural stiffness of portion 20 may be N times the original stiffness of flexible support rod 14. In an exemplary embodiment, the value of the area moment of inertia of outer extendable tube 184 may be chosen to be at least 10 times the value of the area moment of inertia of intermediate extendible tube 182.

In an exemplary embodiment, portion 20 of flexible support rod 14 may be $\frac{3}{5}^{th}$ of the overall height of flexible support rod 14. Accordingly, the heights of inner extendable tube 180, at least one intermediate extendable tube 182, and outer extendable tube 184 may be chosen to be $\frac{4}{5}^{th}$ of the overall height of flexible support rod 14. For example, referring to FIG. 2B, in a fully extended position, first height 181 may be $\frac{4}{5}^{th}$ of an entire height of flexible support rod 14. In other words, inner extendable tube 180, when fully extended, may cover a $\frac{4}{5}^{th}$ of portion 20. Second height 183 may be $\frac{1}{3}^{rd}$ of an entire height of flexible support rod 14. In other words, intermediate extendable tube 182, when fully extended may cover $\frac{3}{5}^{th}$ of portion 20. Third height 185 may be $\frac{2}{5}^{th}$ of an entire height of flexible support rod 14. In other words, intermediate extendable tube 182, when fully extended may cover $\frac{2}{5}^{th}$ of portion 20. In an exemplary embodiment, the amount of extension of inner extendable tube 180, referred to herein as first height 181, may be adjusted such that inner extendable tube 180 may cover between 0 and $\frac{4}{5}^{th}$ of portion 20 of flexible support rod 14. In an exemplary embodiment, the amount of extension of intermediate extendable tube 182, referred to herein as second height 183, may be adjusted such that intermediate extendable tube 182 may cover between 0 and $\frac{1}{3}^{rd}$ of portion 20 of flexible support rod 14. In an exemplary embodiment, the amount of extension of outer extendable tube 184, referred to herein as third height 185, may be adjusted such that outer extendable tube 182 may cover between 0 and $\frac{2}{5}^{th}$ of portion 20 of flexible support rod 14. In an exemplary embodiment, natural frequency tuning mechanism 18 may be configured to adjust the effective flexural stiffness of flexible support rod 14 by adjusting first height 181, second height 183, and third height 185.

In exemplary embodiments, such arrangement of natural frequency tuning mechanism 18 around flexible support rod 14 may allow for changing the effective flexural stiffness of flexible support rod 14 without the need for changing dimensions or center of mass of flexible support rod 14. In an exemplary embodiment, flexible support rod 14 may be fixedly mounted on support surface 110 and may not have any sliding upward or downward movements while extendable tubes 180 to 184 when changing positions between fully retracted positions in FIG. 2C and extended positions in FIG. 2B.

Figure 3A:
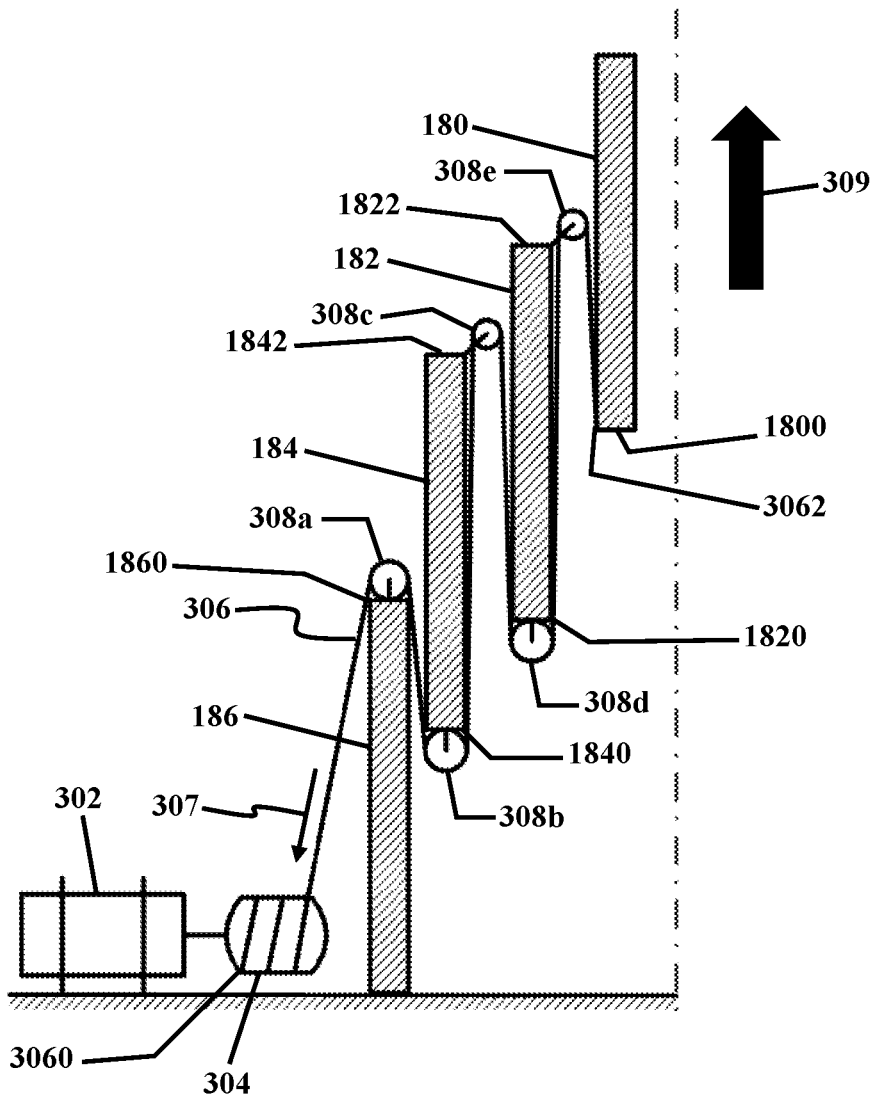
FIGS. 3A-3C illustrate actuating mechanisms for extending/retracting a natural frequency tuning mechanism, consistent with one or more exemplary embodiments of the present disclosure.

FIG. 3A illustrates an actuating mechanism 30 for extending/retracting natural frequency tuning mechanism 18, consistent with one or more exemplary embodiments of the present disclosure. In an exemplary embodiment, actuating mechanism 30 may be a belt-and-pulley mechanism that may include a rotary actuator 302, a drum 304 rotatably coupled with rotary actuator 302, a cable 306 that may be coupled from a first end 3060 of cable 306 to drum 304 such that rotational movement of drum 304 may roll in or roll out cable 306. In an exemplary embodiment, cable 306 may be attached from a second end 3062 of cable 306 to a bottom edge 1800 of inner extendable tube 180. In an exemplary embodiment, cable 306 may further be coupled to a top edge 1860 of housing 186 utilizing pulley 308a, to a bottom edge 1840 of outer extendable tube 184 utilizing pulley 308b, to a top edge 1842 of outer extendable tube 184 utilizing pulley 308c, to a bottom edge 1820 of intermediate extendable tube 182 utilizing pulley 308d, to a top edge 1822 of intermediate extendable tube 182 utilizing pulley 308e. In an exemplary embodiment, such coupling of cable 306 with inner extendable tube 180, intermediate extendable tube 182, and outer extendable tube 184 may allow for rotary actuator 302 to selectively extend or retract inner extendable tube 180, intermediate extendable tube 182, and outer extendable tube 184 out of housing 186. For example, rotary actuator 302 may be configured to rotate drum 304 such that cable 306 may be drawn in a direction shown by arrow 307. In response to cable 306 being drawn in the direction shown by arrow 307, inner extendable tube 180, intermediate extendable tube 182, and outer extendable tube 184 may move upward in a direction shown by arrow 309. For purpose of simplicity, only sectional views of half of inner extendable tube 180, intermediate extendable tube 182, outer extendable tube 184, and housing 186 are illustrated in FIG. 3A.

Figure 3B:
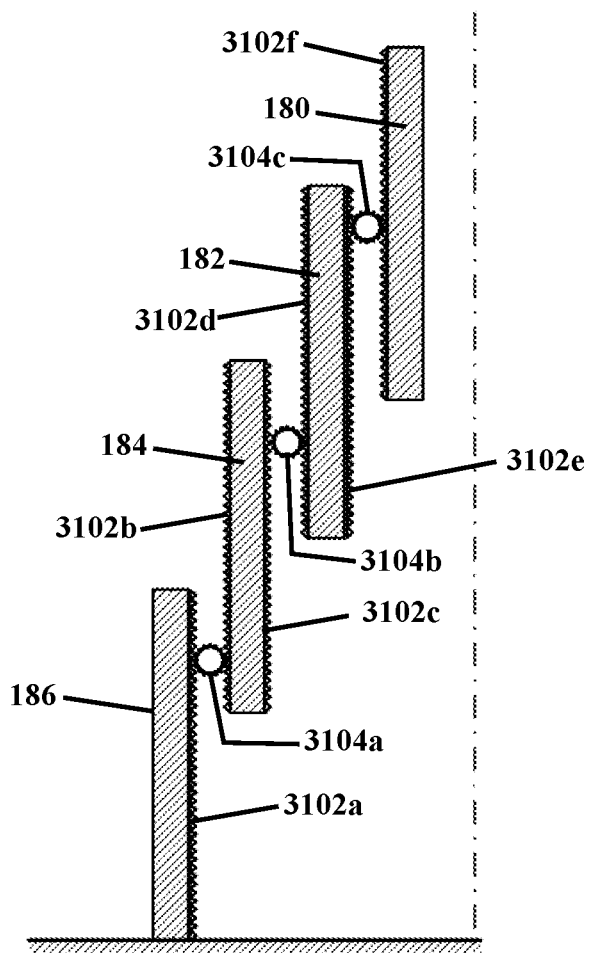

FIG. 3B illustrates an actuating mechanism 31 for extending/retracting natural frequency tuning mechanism 18, consistent with one or more exemplary embodiments of the present disclosure. In an exemplary embodiment, actuating mechanism 31 may be a rack-and-pinion mechanism that may include a plurality of racks 3102a-f attached to sidewalls of inner extendable tube 180, intermediate extendable tube 182, outer extendable tube 184, and housing 186. In an exemplary embodiment, a plurality of actuated pinions 3104a-c may mesh with plurality of racks 3102a-f and may be configured to move inner extendable tube 180, intermediate extendable tube 182, outer extendable tube 184, in and out of housing 186. For purpose of simplicity, only sectional views of half of inner extendable tube 180, intermediate extendable tube 182, outer extendable tube 184, and housing 186 are illustrated in FIG. 3B.

Figure 3C:
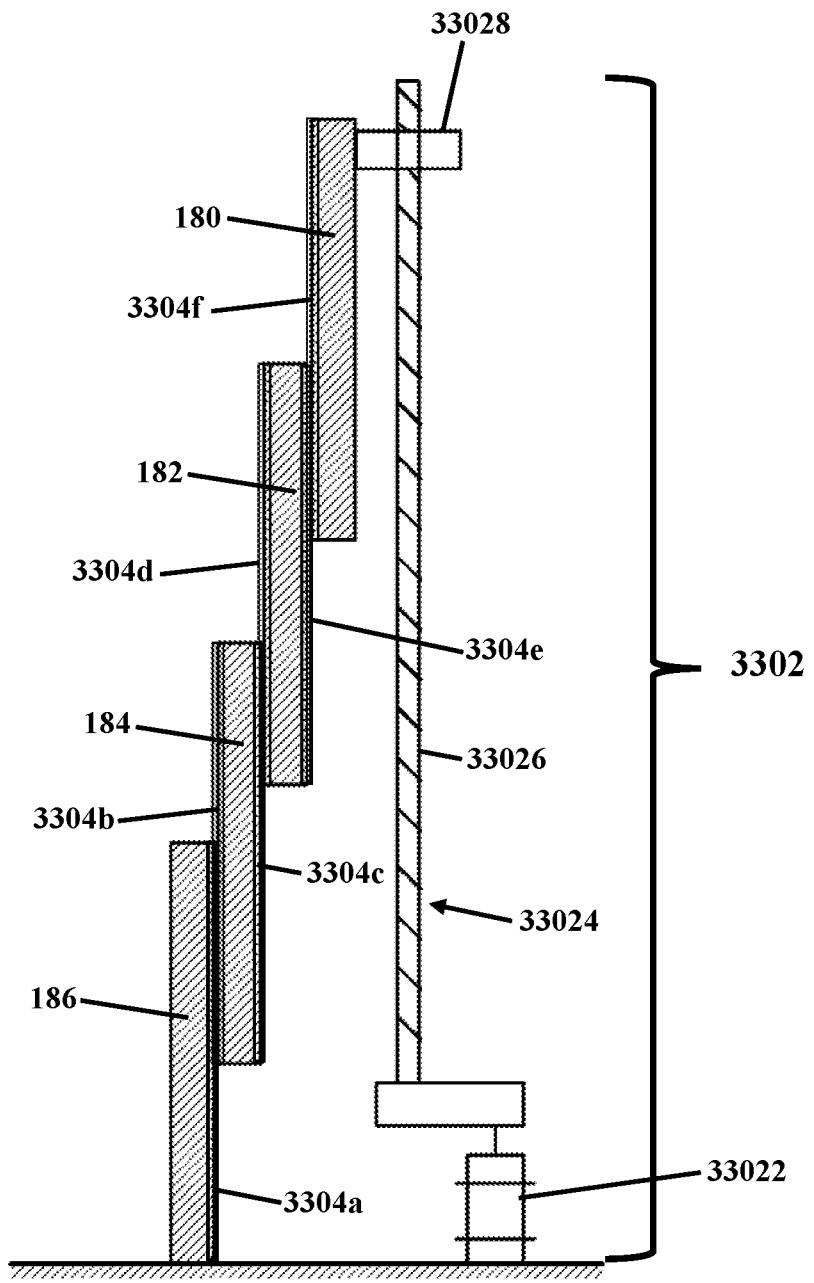

FIG. 3C illustrates an actuating mechanism 33 for extending/retracting natural frequency tuning mechanism 18, consistent with one or more exemplary embodiments of the present disclosure. In an exemplary embodiment, actuating mechanism 33 may include a ball-screw mechanism 3302 that may be coupled with inner extendable tube 180. In an exemplary embodiment, actuating mechanism 33 may further include a plurality of coupling members 3304a-f that may be attached to sidewalls of inner extendable tube 180, intermediate extendable tube 182, outer extendable tube 184, and housing 186. In an exemplary embodiment, coupling members 3304a-f may be sliding tracks that may allow for inner extendable tube 180, intermediate extendable tube 182, outer extendable tube 184 to slide in and out of housing 186 in response to ball-screw mechanism 3302 pulling inner extendable tube 180 up and down. In an exemplary embodiment, ball-screw mechanism 3302 may include a rotary actuator 33022 coupled to a ball-screw 33024. Ball-screw 33024 may include a screw 33026 and a nut 33028, where screw 33026 may be rotated by rotary actuator 33022 and nut 33028 may assume a linear movement along screw 33026. In an exemplary embodiment, nut 33028 may be attached to inner extendable tube 180 and may be configured to convert the rotary movement of rotary actuator 33022 to linear movement of inner extendable tube 180. For purpose of simplicity, only sectional views of half of inner extendable tube 180, intermediate extendable tube 182, outer extendable tube 184, and housing 186 are illustrated in FIG. 3C.

In an exemplary embodiment, power take-off unit (PTO) 16 may be coupled with flexible support rod 14 and may be configured to convert the oscillatory movement of flexible support rod 14 into electrical energy. In an exemplary embodiment, PTO 16 may be at least one of a piezoelectric generator and a permanent magnet generator.

Figure 4:
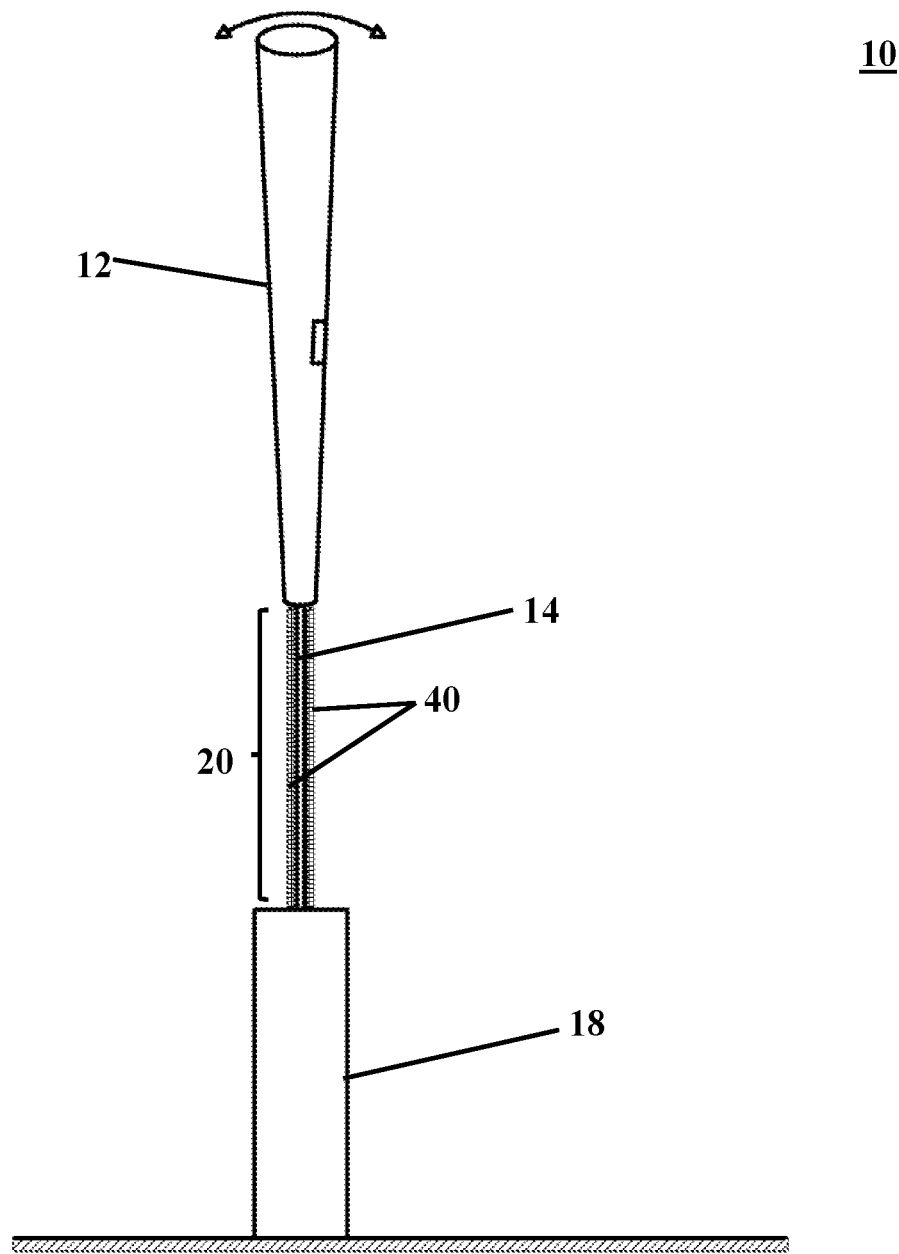
FIG. 4 illustrates a schematic view of a bladeless wind turbine with a piezoelectric generator, consistent with one or more exemplary embodiments of the present disclosure.

FIG. 4 illustrates a schematic view of bladeless wind turbine 10 with a piezoelectric generator 40, consistent with one or more exemplary embodiments of the present disclosure. In an exemplary embodiment, piezoelectric generator 40 may functionally be similar to PTO 16. In an exemplary embodiment, piezoelectric generator 40 may include at least one piezoelectric layer that may cover flexible support rod 14. In an exemplary embodiment, at least one piezoelectric layer of piezoelectric generator 40 may deform in response to oscillatory movement of flexible support rod 14 and may generate electricity.

Figure 5:
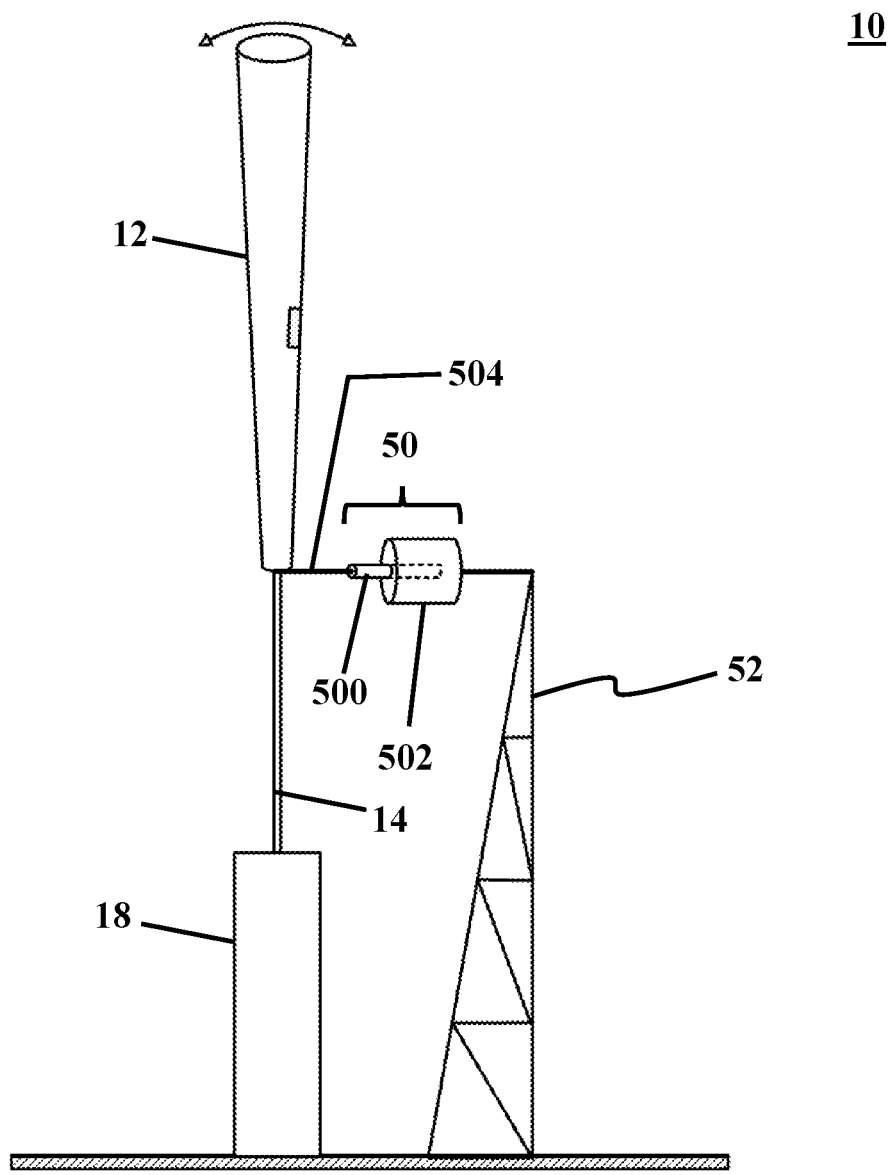
FIG. 5 illustrates a schematic view of a bladeless wind turbine with a permanent magnet generator, consistent with one or more exemplary embodiments of the present disclosure.

FIG. 5 illustrates a schematic view of bladeless wind turbine 10 with a permanent magnet generator 50, consistent with one or more exemplary embodiments of the present disclosure. In an exemplary embodiment, permanent magnet generator 50 may functionally be similar to PTO 16. In an exemplary embodiment, permanent magnet generator 50 may include a permanent magnet core 500 that may be slidably moveable within a coil 502. In an exemplary embodiment, permanent magnet core 500 may be coupled to flexible support rod 14 utilizing an input rod 504. In an exemplary embodiment, oscillatory movement of flexible support rod 14 may be converted to reciprocating movement of permanent magnet core 500 within coil 502, which in turn may lead to induction of electricity within coil 502. In an exemplary embodiment, permanent magnet generator 50 may be fixedly attached to a support structure 52 mounted near bladeless wind turbine 10.

Figure 6:
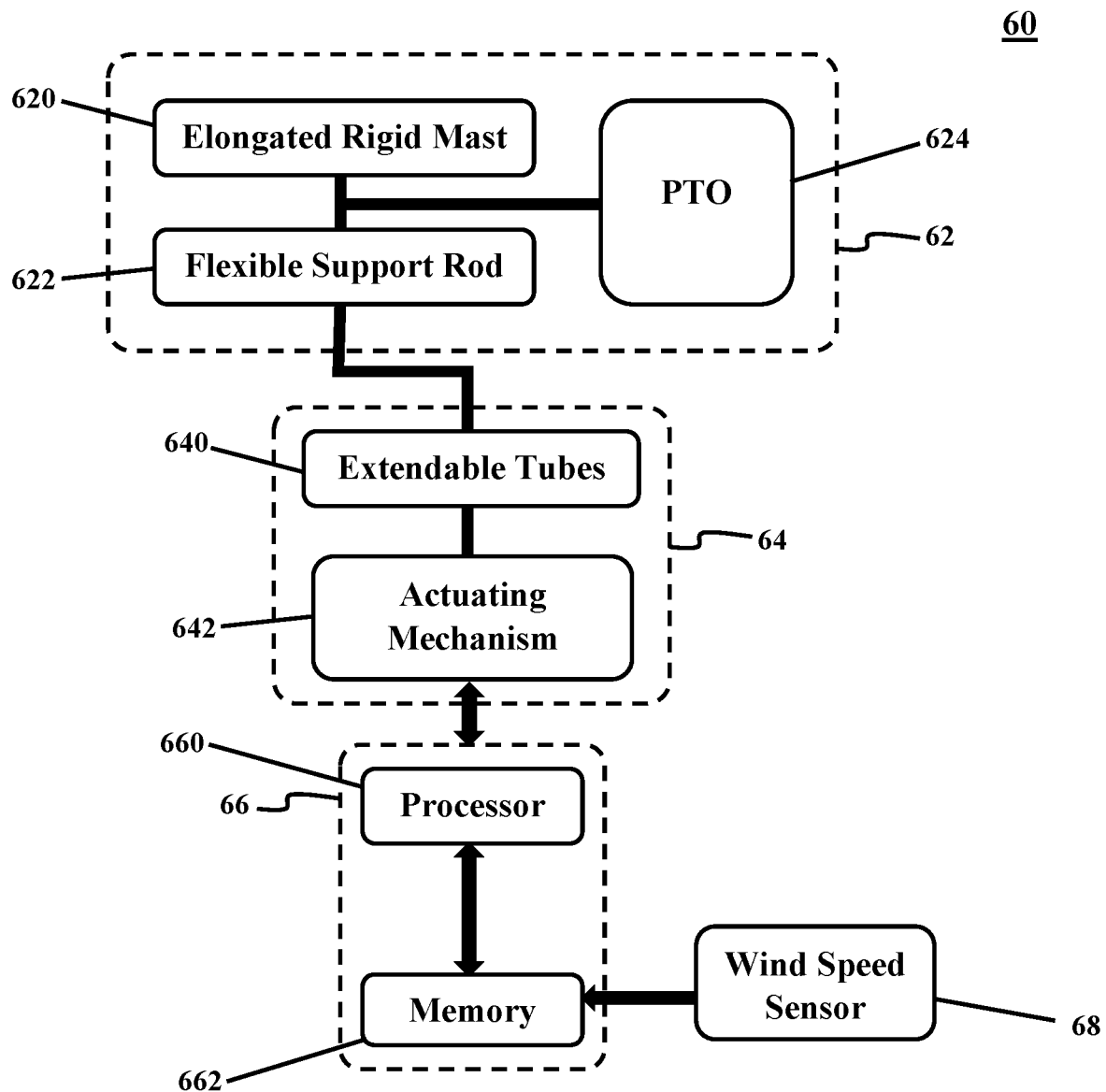
FIG. 6 illustrates a block diagram of a bladeless wind turbine system, consistent with one or more exemplary embodiments of the present disclosure.

FIG. 6 illustrates a block diagram of a bladeless wind turbine system 60, consistent with one or more exemplary embodiments of the present disclosure. In an exemplary embodiment, bladeless wind turbine system 60 may include a VIV bladeless wind turbine 62 that may be coupled to a natural frequency tuning mechanism 64. In an exemplary embodiment, natural frequency tuning mechanism 64 may be coupled to a controller 66. Controller 66 may be configured to control natural frequency tuning mechanism 64 based at least in part on data received from a wind speed sensor 68. In an exemplary embodiment, wind speed sensor 68 may be configured to measure wind speeds near VIV bladeless wind turbine 62. Wind speed sensor 68 may further be configured to transmit the measured wind speeds to controller 66.

In an exemplary embodiment, VIV bladeless wind turbine 62 may include an elongated rigid mast 620 that may be similar to elongated rigid mast 12, a flexible support rod 622 that may be similar to flexible support rod 14, and a PTO 624 similar to PTO 16 that may be configured to convert the respective oscillatory movements of elongated rigid mast 620 and flexible support rod 622 into electrical energy. In an exemplary embodiment, PTO 624 may be either coupled to elongated rigid mast 12 or flexible support rod 622. PTO 624 may be configured to receive the mechanical oscillatory movement of either elongated rigid mast 12 or flexible support rod 622 and may convert it to electricity by utilizing, for example, a magnet-and-coil arrangement (FIG. 5), piezoelectric arrangements (FIG. 4), or other similar mechanisms.

In an exemplary embodiment, natural frequency tuning mechanism 64 may be similar to natural frequency tuning mechanism 18 and may include a plurality of extendable tubes 640. In an exemplary embodiment, plurality of extendable tubes 640 may include a plurality of coaxial extendable tubes similar to inner extendable tube 180, intermediate extendable tube 182, and outer extendable tube 184. In an exemplary embodiment, extendable tubes 640 may be coupled to an actuating mechanism 642. Actuating mechanism 642 may be configured to actuate extension/retraction of each of extendable tubes 640, for example, from a fully retracted position as illustrated in FIG. 2C to an extended position as illustrated in FIG. 2B. In an exemplary embodiment, actuating mechanism 642 may be configured to individually extend or retract each of extendable tubes 640 independent from each other.

In an exemplary embodiment, wind speed sensor 68 may be one of a vane anemometer, a cup anemometer, an ultrasonic anemometer, Lidar, or a hot wire sensor. In an exemplary embodiment, wind speed sensor 68 may either be mounted on VIV bladeless wind turbine 62 or at a position near VIV bladeless wind turbine 62. In an exemplary embodiment, wind speed sensor 68 may be configured to measure and transmit the wind speed, as used herein, the wind speed may refer to a relative velocity between the wind and elongated rigid mast 620.

In an exemplary embodiment, controller 66 may be coupled to wind speed sensor 68, and actuating mechanism 642 of natural frequency tuning mechanism 64 via wired links, wireless links, or a combination of wired and wireless links. In an exemplary embodiment, controller 66 may be configured to receive wind speed data from wind speed sensor 68. In an exemplary embodiment, controller 66 may be configured to urge actuating mechanism 642 of natural frequency tuning mechanism 64 to extend or retract extendable tubes 640 based at least in part on wind speed data.

In an exemplary embodiment, controller 66 may be a programmable logic controller, such as a personal computer that may include a processor 660 and a memory 662 that may be coupled to processor 660. Memory 662 may include executable instructions that, when executed, cause processor 660 to perform operations that in an exemplary embodiment may include calculating vortex shedding frequency based on the wind speed data and determining the required amount of extension or retraction of extendable tubes 640 based on the calculated vortex shedding frequency.

In an exemplary embodiment, memory 662 may include executable instructions that, when executed, may cause processor 660 to perform operations defined by equation (1) below to calculate vortex shedding frequency, $\omega_s$, based on the wind speed received from wind speed sensor 68:

$$\omega_s = 2\pi S U_0 / D \qquad \text{Equation (1)}$$

where S is the Strouhal number, D is the mean diameter of elongated rigid mast 12, and $U_0$ is the wind speed measured by wind speed sensor 68. In order to enhance the performance of VIV bladeless wind turbine 62 in terms of energy output, natural frequency, $\omega_n$ of VIV bladeless wind turbine 62 should be equal or very close to being equal to the vortex shedding frequency, $\omega_s$. In an exemplary embodiment, memory 662 may further include executable instructions that, when executed, may cause processor 660 to determine the required amounts of extension or retraction of extendable tubes 640 by equating $\omega_s$ and $\omega_n$. In an exemplary embodiment, natural frequency, $\omega_n$ of VIV bladeless wind turbine 62 may be defined by equation (2) below:

$$\omega_n = \sqrt{\frac{K_{\mathit{eff}}}{M_{\mathit{eff}}}} \qquad \text{Equation (2)}$$

where $K_{\mathit{eff}}$ and $M_{\mathit{eff}}$ are respectively the effective flexural stiffness and effective moment of inertia of flexible support rod 622 and extendable tubes 640, defined by:

$$K_{\mathit{eff}} = \int_{L_s} E_s I_s [\phi''(x)]^2 dx + \int_{L_{\mathit{inn}}} E_{\mathit{inn}} I_{\mathit{inn}} [\phi''(x)]^2 dx +$$
$$\int_{L_{\mathit{mid}}} E_{\mathit{mid}} I_{\mathit{mid}} [\phi''(x)]^2 dx + \int_{L_{\mathit{out}}} E_{\mathit{out}} I_{\mathit{out}} [\phi''(x)]^2 dx$$

$$M_{\mathit{eff}} = \int_{L_s} \phi^2(x) A_s \rho_s dx + \int_{L_{\mathit{inn}}} \phi^2(x) A_{\mathit{inn}} \rho_{\mathit{inn}} dx +$$
$$\int_{L_{\mathit{mid}}} \phi^2(x) A_{\mathit{mid}} \rho_{\mathit{mid}} dx + \int_{L_{\mathit{out}}} \phi^2(x) A_{\mathit{out}} \rho_{\mathit{out}} dx +$$
$$m_m \left[ \phi^2(L_s) + 2 \bar{L}_m \phi(L_s) \phi'(L_s) + \left( \bar{L}_m^2 + \frac{\bar{I}_m}{m_m} \right) \phi'^2(L_s) \right]$$

where, $E_s$, $E_{\mathit{inn}}$, $E_{\mathit{mid}}$, and $E_{\mathit{out}}$ are respectively the moduli of elasticity of flexible support rod 622, inner extendable tube 180, intermediate extendable tube 182, and outer extendable tube 184. $I_s$, $I_{\mathit{inn}}$, $I_{\mathit{mid}}$, and $I_{\mathit{out}}$ are respectively the area moments of inertia of flexible support rod 622, inner extendable tube 180, intermediate extendable tube 182, and outer extendable tube 184. $A_s$, $A_{\mathit{inn}}$, $A_{\mathit{mid}}$, and $A_{\mathit{out}}$ are respectively the cross-sectional areas of flexible support rod 622, inner extendable tube 180, intermediate extendable tube 182, and outer extendable tube 184. $\rho_s$, $\rho_{\mathit{inn}}$, $\rho_{\mathit{mid}}$, and $\rho_{\mathit{out}}$ are respectively the mass densities of flexible support rod 622, inner extendable tube 180, intermediate extendable tube 182, and outer extendable tube 184. $L_s$, $L_{\mathit{inn}}$, $L_{\mathit{mid}}$, and $L_{\mathit{out}}$ are respectively the amount of extensions of flexible support rod 622, inner extendable tube 180, intermediate extendable tube 182, and outer extendable tube 184. $m_m$ is the mass of elongated rigid mast 620, $\bar{L}_m$ is the height of the center of mass of elongated rigid mast 620, $\bar{I}_m$ is the mass moment of inertia of elongated rigid mast 620, and $$\phi(x) = (\cos \beta x - \cosh \beta x) + \frac{(\cos \beta l - \cosh \beta l)}{(\sin \beta l - \cosh \beta l)}(\sin \beta x - \sinh \beta x) \text{ with } \beta = 1.88/L_s.$$

In an exemplary embodiment, memory 662 may include executable instructions that, when executed, may cause processor 660 to determine the required amount of extension or retraction of extendable tubes 640 at a wind speed of $U_0$ by equating $\omega_s$ and $\omega_n$. In an exemplary embodiment, equating $\omega_s$ and $\omega_n$ may refer to utilizing $\omega_s$ values as $\omega_n$ value for Equation (2). In other words, the following operations may be performed by processor 660 to determine the required amounts of extension or retraction of extendable tubes 640 at a wind speed of $U_0$. First, $\omega_s$ may be calculated utilizing equation (1). Then, $\omega_s$ may be utilized as $\omega_n$ value for Equation (2), and equation (2) may be solved accordingly for $L_{inn}$, $L_{mid}$, and $L_{out}$, which are respectively the amounts of extension of inner extendable tube 180, intermediate extendable tube 182, and outer extendable tube 184. Referring to FIG. 2B, in an exemplary embodiment, $L_{inn}$ may refer to first height 181, $L_{mid}$ may refer to second height 183, and $L_{out}$ may refer to third height 185.

In an exemplary embodiment, memory 662 may further include executable instructions that, when executed, may cause processor 660 to urge actuating mechanism 642 to actuate extension of inner extendable tube 180 by the calculated amount of $L_{inn}$, intermediate extendable tube 182 by the calculated amount of $L_{mid}$, and outer extendable tube 184 by the calculated amount $L_{out}$.

In exemplary embodiments, if inner extendable tube 180, at least one intermediate extendable tube 182, and outer extendable tube 184 are chosen to have cross-sections with the same value of the area moment of inertia as flexible support rod 622, by extending N extendable tubes to the extended position, the flexural stiffness of the entire portion 20 will be N+1 times its original stiffness. According to equations (1) and (2), such increase in the stiffness results in an increase in lock-in wind speed to $\sqrt{N+1}$ times the original lock-in wind speed. Eventually, extending inner extendable tube 180, intermediate extendable tube 182, and outer extendable tube 184 to fully extended positions, exemplary VIV bladeless wind turbine 62 may be able to extract energy in wind speeds that are as large as $\sqrt{3}$ times the maximum wind speed that could have been harvested by an exemplary VIV bladeless wind turbine without natural frequency tuning mechanism 64. As used herein, N extendable tubes may refer to inner extendable tube 180, outer extendable tube 184, and (N−2) intermediate extendable tubes similar to intermediate extendable tube 182.

Figure 7:
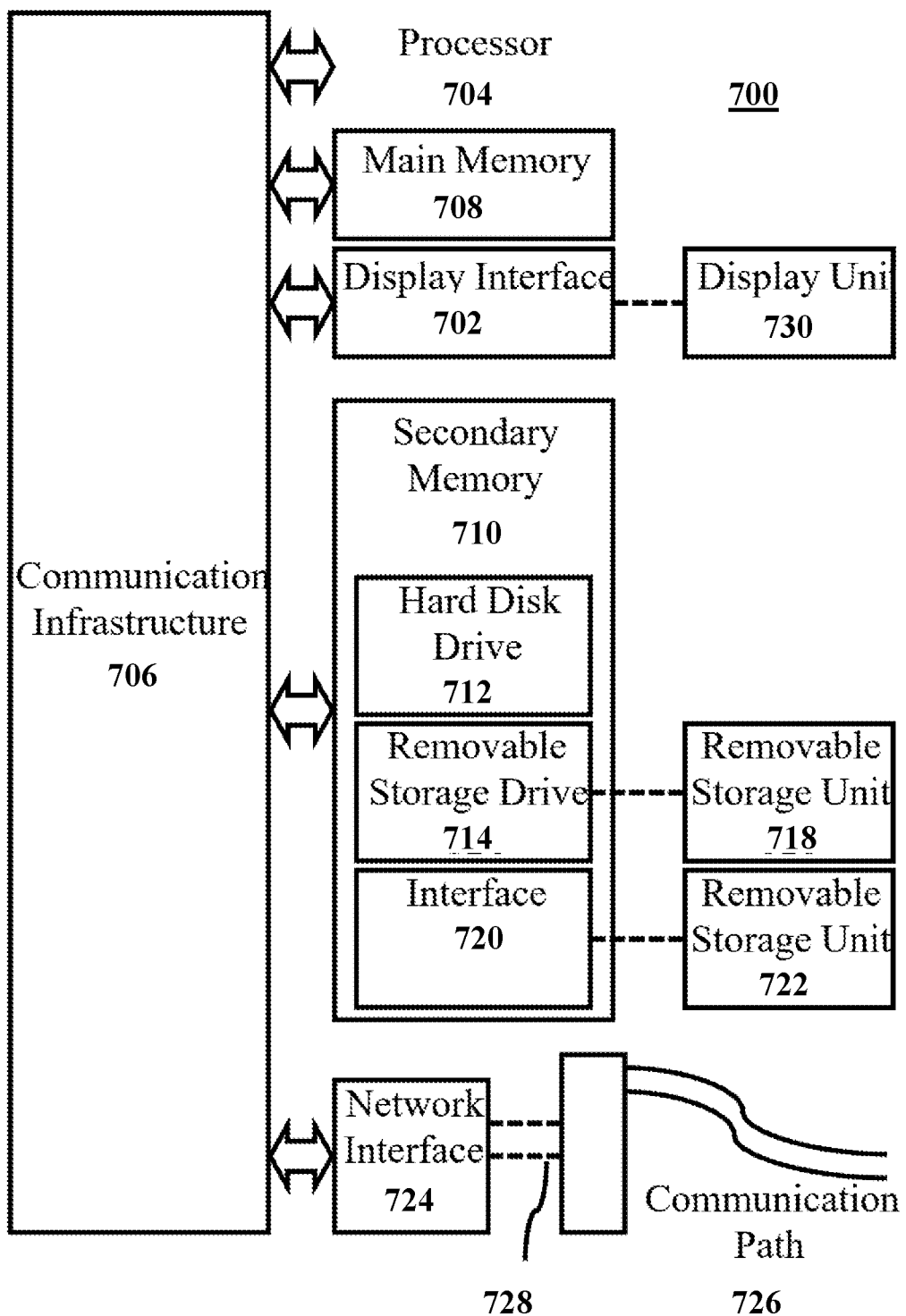
FIG. 7 illustrates a high-level functional block diagram of a computer system 700, consistent with one or more exemplary embodiments of the present disclosure.

FIG. 7 illustrates a high-level functional block diagram of a computer system 700, in which an embodiment of the present invention, or portions thereof, may be implemented as computer-readable code, consistent with exemplary embodiments of the present disclosure. For example, controller 66 may be implemented in computer system 700 using hardware, software, firmware, tangible computer-readable media having instructions stored thereon, or a combination thereof and may be implemented in one or more computer systems or other processing systems.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 400. After reading this description, it will become apparent to a person skilled in the relevant art how to implement the invention using other computer systems and/or computer architectures. Although operations may be described as a sequential process, some of the operations may be performed in parallel, concurrently, and/or in a distributed environment, and with program code stored locally or remotely for access by single or multi-processor machines. Also, in some embodiments, the order of operations may be rearranged without departing from the spirit of the disclosed subject matter.

Processor device 704 may be a special purpose or a general-purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 may be connected to a communication infrastructure 706, for example, a bus, message queue, network, or multi-core message-passing scheme.

In an exemplary embodiment, computer system 700 may include a display interface 702, for example, a video connector, to transfer data to a display unit 730, for example, a monitor. Computer system 700 may also include a main memory 708, for example, random access memory (RAM), and may also include a secondary memory 710. Secondary memory 710 may include, for example, a hard disk drive 712, and a removable storage drive 714. Removable storage drive 714 may include a floppy disk drive, a magnetic tape drive, an optical disk drive, a flash memory, or the like. Removable storage drive 714 may read from and/or write to a removable storage unit 718 in a well-known manner. Removable storage unit 718 may include a floppy disk, a magnetic tape, an optical disk, etc., which may be read by and written to by removable storage drive 714. As will be appreciated by persons skilled in the relevant art, removable storage unit 718 may include a computer-usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot, and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer-usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement different embodiments of the present disclosure as discussed herein. In particular, the computer programs, when executed, enable processor device 704 to implement the processes of the present disclosure, such as the operations in system 60. Accordingly, such computer programs represent controllers of computer system 700. Where an exemplary embodiment of controller 66 is implemented using software, the software may be stored in a computer program product and loaded into computer system 700 using removable storage drive 714, interface 720, and hard disk drive 712, or communications interface 724.

Embodiments of the present disclosure also may be directed to computer program products including software stored on any computer useable medium. Such software, when executed in one or more data processing devices, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A bladeless wind turbine, comprising:
    a flexible support rod mounted on a support surface, a main axis of the flexible support rod perpendicular to the support surface;
    an elongated rigid mast mounted on the flexible support rod, the elongated rigid mast in axial alignment with the flexible support rod;
    a natural tuning mechanism coaxially mounted around a first portion of the flexible support rod, the natural tuning mechanism comprising:
        a housing coaxially attached to the flexible support rod, the housing comprising a bottom end fixedly attached to the support surface and a top end;
        at least one extendable tube slidably housed within the housing, the at least one extendable tube coaxially mounted and fitted around the flexible support rod, the at least one extendable tube slidably moveable along the main axis of the flexible support rod, the at least one extendable tube extendable beyond the top end of the housing by a predetermined height;
    a power take-off unit coupled to the flexible support rod, the power take-off unit configured to convert oscillatory movements of the flexible support rod into electrical energy; and
    a control unit coupled to the natural tuning mechanism, the control unit comprising:
        a wind speed sensor configured to measure and transmit a relative velocity between an incoming wind and the elongated rigid mast;
        a controller coupled to the wind speed sensor and the natural tuning mechanism, the controller configured to:
            receive, utilizing one or more processors, the relative velocity between the incoming wind and the elongated rigid mast from the wind speed sensor;
            calculate, utilizing the one or more processors, the predetermined height based at least in part on the received relative velocity between the incoming wind and the elongated rigid mast; and
            urge, utilizing the one or more processors, the at least one extendable tube to extend beyond the top end of the housing by the predetermined height.

2. The bladeless wind turbine of claim 1, further comprising a linear actuating mechanism coupled to the at least one extendable tube, the linear actuating mechanism configured to drive a linear sliding movement of the at least one extendable tube along the main axis of the flexible support rod, the controller coupled to the linear actuating mechanism, the controller configured to urge the linear actuating mechanism to extend the at least one extendable tube beyond the top end of the housing by the predetermined height.

3. The bladeless wind turbine of claim 2, wherein the at least one extendable tube comprises:
   an outer extendable tube mounted within the housing, the outer extendable tube axially slidable with respect to the housing, an outer surface of the outer extendable tube snuggly fitted with an inner surface of the housing;
   at least one intermediate extendable tube mounted within the outer extendable tube, the at least one intermediate extendable tube axially slidable with respect to the outer extendable tube, an outer surface of the at least one intermediate extendable tube snuggly fitted with an inner surface of the outer extendable tube; and
   an inner extendable tube mounted within the at least one intermediate extendable tube, an outer surface of the inner extendable tube snuggly fitted with an inner surface of the at least one intermediate extendable tube, an inner surface of the inner extendable tube snuggly fitted around an outer surface of the flexible support rod, the inner extendable tube axially slidable with respect to the at least one intermediate extendable tube along the main axis of the flexible support rod.

4. The bladeless wind turbine of claim 3, wherein the inner extendable tube is axially slidable out of the housing beyond the top end of the housing by a first height, the at least one intermediate extendable tube axially slidable out of the housing beyond the top end of the housing by a second height, and the outer extendable tube axially slidable out of the housing beyond the top end of the housing by a third height.

5. The bladeless wind turbine of claim 4, wherein the controller comprises:
   the one or more processors; and
   at least one memory coupled to the one or more processors, the at least one memory storing executable instructions to urge the one or more processors to:
      receive the relative velocity between the incoming wind and the elongated rigid mast;
      calculate a vortex shedding frequency via performing operations defined by:

$$\omega_s = 2\pi S U_0/D$$

wherein, $\omega_s$ is the vortex shedding frequency, S is the Strouhal number, D is a mean diameter of the elongated rigid mast, and $U_0$ is the relative velocity between the incoming wind and the elongated rigid mast;
      determine the first height, the second height, and the third height by equating the calculated vortex shedding frequency and a natural frequency of the bladeless wind turbine by solving the following equation for the first height, the second height, and the third height:

$$\omega_s = \sqrt{K_{\it eff}/M_{\it eff}}$$

wherein, $$K_{\it eff} = \int_{L_s} E_s I_s [\phi''(x)]^2 dx + \int_{L_{inn}} E_{inn} I_{inn} [\phi''(x)]^2 dx +$$

$$\int_{L_{mid}} E_{mid} I_{mid} [\phi''(x)]^2 dx + \int_{L_{out}} E_{out} I_{out} [\phi''(x)]^2 dx$$

and $$M_{\it eff} = \int_{L_s} \phi^2(x) A_s \rho_s dx + \int_{L_{inn}} \phi^2(x) A_{inn} \rho_{inn} dx +$$

$$\int_{L_{mid}} \phi^2(x) A_{mid} \rho_{mid} dx + \int_{L_{out}} \phi^2(x) A_{out} \rho_{out} dx +$$

$$m_m \left[ \phi^2(L_s) + 2\bar{L}_m \phi(L_s) \phi'(L_s) + \left( \bar{L}_m^2 + \frac{\bar{I}_m}{m_m} \right) \phi'^2(L_s) \right]$$

wherein:
$E_s$, $E_{inn}$, $E_{mid}$, and $E_{out}$ are, respectively, the moduli of elasticity of the flexible support rod, the inner extendable tube, the intermediate extendable tube, and the outer extendable tube,
$I_s$, $I_{inn}$, $I_{mid}$, and $I_{out}$ are, respectively, the area moments of inertia of the flexible support rod, the inner extendable tube, the intermediate extendable tube, and the outer extendable tube,
$A_s$, $A_{inn}$, $A_{mid}$, and $A_{out}$ are, respectively, the cross-sectional areas of the flexible support rod, the inner extendable tube, the intermediate extendable tube, and the outer extendable tube,
$\rho_s$, $\rho_{inn}$, $\rho_{mid}$, and $\rho_{out}$ are, respectively, the mass densities of the flexible support rod, the inner extendable tube, the intermediate extendable tube, and the outer extendable tube,
$L_s$, $L_{inn}$, $L_{mid}$, and $L_{out}$ are, respectively, a height of a portion of the flexible support rod extended beyond the top end of the housing, the first height, the second height, and the third height,
$m_m$ is the mass of the elongated rigid mast,
$\bar{L}_m$ is a height of the center of mass of the elongated rigid mast as measured from the support surface,
$\bar{I}_m$ is the mass moment of inertia of the elongated rigid mast, and $$\phi(x) = (\cos \beta x - \cosh \beta x) + \frac{(\cos \beta l - \cosh \beta l)}{(\sin \beta l - \cosh \beta l)} (\sin \beta x - \sinh \beta x) \text{ with } \beta = 1.88/L_s.$$

6. The bladeless wind turbine of claim 4, wherein the controller is configured to urge the linear actuating mechanism to extend the inner extendable tube beyond the top end of the housing by the first height, the first height being between 0 and $4/9^{th}$ of a total height of the flexible support rod.

7. The bladeless wind turbine of claim 4, wherein the controller is configured to urge the linear actuating mechanism to extend the at least one intermediate extendable tube beyond the top end of the housing by the second height, the second height being between 0 and $1/3^{rd}$ of a total height of the flexible support rod.

8. The bladeless wind turbine of claim 4, wherein the controller is configured to urge the linear actuating mechanism to extend the outer extendable tube beyond the top end of the housing by the third height, the third height being between 0 and $2/9^{th}$ of a total height of the flexible support rod.

9. The bladeless wind turbine of claim 3, wherein the inner extendable tube comprises an inner radius of $R_0$ and an outer radius of $2^{0.25} \times R_0$, wherein $R_0$ is a radius of the flexible support rod.

10. The bladeless wind turbine of claim 9, wherein the at least one intermediate extendable tube comprises an inner radius of $2^{0.25} \times R_0$ and an outer radius of $3^{0.25} \times R_0$.

11. The bladeless wind turbine of claim 10, wherein the outer extendable tube comprises an inner radius of $3^{0.25} \times R_0$ and an outer radius of $4^{0.25} \times R_0$.

12. The bladeless wind turbine of claim 1, wherein a height of the first portion of the flexible support rod is equal to $4/9^{th}$ of an entire height of the flexible support rod.

13. The bladeless wind turbine of claim 12, wherein the power take-off unit comprises a permanent magnet generator, the permanent magnet generator comprising:
   a coil; and
   a permanent magnet movably received within the coil, the permanent magnet coupled to the flexible support rod at a point on a top portion of the flexible support rod, wherein the permanent magnet assumes a reciprocating movement within the coil responsive to oscillatory movements of the flexible support rod.

14. The bladeless turbine of claim 12, wherein the power take-off unit comprises a piezoelectric generator, the piezoelectric generator comprising a piezoelectric layer covering a remaining second portion of the flexible support rod above the first portion, a height of the second portion being equal to $5/9^{th}$ of the entire height of the flexible support rod extended beyond the top end of the housing.

* * * * *